(12) United States Patent
Bruno

(10) Patent No.: US 7,802,565 B2
(45) Date of Patent: Sep. 28, 2010

(54) BARBECUE GRILL

(75) Inventor: Adrian A. Bruno, Rolling Meadows, IL (US)

(73) Assignee: Weber-Stephen Products Co., Palatine, IL (US)

( * ) Notice: Subject to any disclaimer, the term of this patent is extended or adjusted under 35 U.S.C. 154(b) by 97 days.

(21) Appl. No.: 11/688,924

(22) Filed: Mar. 21, 2007

(65) Prior Publication Data

US 2008/0230045 A1 Sep. 25, 2008

(51) Int. Cl.
*A47J 33/00* (2006.01)
*A47J 36/26* (2006.01)
*B65D 83/74* (2006.01)

(52) U.S. Cl. .................. 126/25 R; 126/29; 126/9 R; 126/148; 126/38; 126/39 M; 110/268; 110/298; 110/317

(58) Field of Classification Search ............... 126/25 R, 126/9 R, 36, 38, 39 M, 144–148, 273.5, 9 A, 126/9 B, 12, 26, 29, 152 A, 152 B, 152 R, 126/153, 162, 163 A, 163 R, 168; 219/609, 219/620, 621, 385, 386, 391, 392; 431/129, 431/135, 146, 149, 152; D7/355, 356; 110/98, 110/268, 292, 297, 298, 317, 322, 326–328; 206/515, 518; 220/62; 229/114, 120; *A47J 33/00, A47J 36/26; B65D 83/74*
See application file for complete search history.

(56) References Cited

U.S. PATENT DOCUMENTS

| 418,810 | A | * | 1/1890 | Musick ..................... 126/542 |
| 494,989 | A | * | 4/1893 | Martin ................... 126/152 R |
| 564,320 | A | * | 7/1896 | Underwood et al. ...... 126/25 R |
| 1,704,175 | A | * | 3/1929 | Coale ........................ 229/5.82 |
| 1,966,945 | A | * | 7/1934 | Bowers ................... 126/152 R |
| 2,447,938 | A | * | 8/1948 | Garfunkle .................... 248/165 |
| 2,994,316 | A |   | 8/1956 | Brender |
| 2,998,814 | A |   | 9/1961 | Forsberg |
| 3,035,566 | A | * | 5/1962 | Keeney ..................... 126/25 R |
| 3,316,892 | A | * | 5/1967 | Hanke ....................... 126/25 R |

(Continued)

FOREIGN PATENT DOCUMENTS

EP 438327 A1 * 7/1991

(Continued)

*Primary Examiner*—Steven B McAllister
*Assistant Examiner*—Daniel E Namay
(74) *Attorney, Agent, or Firm*—Baker & McKenzie LLP; David I. Roche; Daniel A. Tallitsch

(57) ABSTRACT

A charcoal fired barbecue grill is described and shown herein. In one embodiment, a charcoal grate is disclosed which is formed from a sheet metal material. The charcoal grate includes a bottom wall and a plurality of side walls. The bottom wall includes a plurality of apertures to allow combustion air to reach the charcoal and a plurality of embossments to increase the structural rigidity of the charcoal tray. At least some of the side walls include side wall extensions which are configured to engage with the barbecue grill firebox to support the charcoal grate underneath the cooking grate. In a second embodiment, a charcoal grill firebox is disclosed which includes a dual purpose nesting target on an inside surface. The nesting target is not only configured to support a grate, it is also configured to nest with a corresponding nesting feature which is positioned on an outside surface of the firebox.

17 Claims, 6 Drawing Sheets

U.S. PATENT DOCUMENTS

| | | | | |
|---|---|---|---|---|
| 3,606,066 | A | * | 9/1971 | Anderson .................. 126/25 R |
| 3,696,800 | A | * | 10/1972 | Close, Jr. .................. 126/25 A |
| 3,828,759 | A | | 8/1974 | Cooper |
| 3,841,211 | A | * | 10/1974 | Ellis ............................ 99/482 |
| 3,841,299 | A | * | 10/1974 | Tomita ..................... 126/25 B |
| 3,959,620 | A | * | 5/1976 | Stephen, Jr. ................. 219/386 |
| 4,300,444 | A | * | 11/1981 | Muse ........................... 99/448 |
| 4,382,432 | A | * | 5/1983 | Lizdas ....................... 126/25 A |
| 4,463,746 | A | | 8/1984 | Knuth et al. |
| 4,495,860 | A | * | 1/1985 | Hitch et al. .................... 99/340 |
| 4,532,913 | A | * | 8/1985 | Murase ......................... 126/58 |
| 4,572,062 | A | * | 2/1986 | Widdowson .................. 99/345 |
| 4,759,495 | A | * | 7/1988 | Moon .......................... 229/101 |
| 4,877,010 | A | * | 10/1989 | Hait ............................ 126/9 R |
| 4,932,390 | A | * | 6/1990 | Ceravolo ............... 126/25 AA |
| 4,938,202 | A | * | 7/1990 | Hait ............................ 126/9 R |
| 4,989,579 | A | * | 2/1991 | Murphy et al. ............ 126/41 R |
| 5,168,860 | A | * | 12/1992 | Kibourian ................. 126/25 R |
| 5,226,405 | A | * | 7/1993 | Snow ........................ 126/25 B |
| 5,293,859 | A | | 3/1994 | Lisker |
| 5,299,931 | A | | 4/1994 | Lee |
| 5,359,988 | A | * | 11/1994 | Hait ........................... 126/25 R |
| 5,406,930 | A | * | 4/1995 | Ragland et al. ............ 126/25 R |
| 5,408,989 | A | * | 4/1995 | Vestal, Sr. .................... 126/540 |
| 5,503,138 | A | * | 4/1996 | Chang ...................... 126/25 R |
| 5,535,733 | A | * | 7/1996 | Hait ............................. 126/59 |
| 5,718,165 | A | | 2/1998 | Winstead |
| RE35,998 | E | * | 12/1998 | Goto ........................... 99/446 |
| 5,875,772 | A | | 3/1999 | Saey |
| 5,878,739 | A | * | 3/1999 | Guidry ...................... 126/25 R |
| 5,911,812 | A | * | 6/1999 | Stanek et al. ................. 99/446 |
| 6,000,389 | A | * | 12/1999 | Alpert ....................... 126/25 R |
| 6,131,560 | A | | 10/2000 | Healy |
| 6,173,644 | B1 | * | 1/2001 | Krall ............................ 99/340 |
| D492,156 | S | * | 6/2004 | Siegel et al. ................. D7/408 |
| 6,929,001 | B2 | * | 8/2005 | Yoon ..................... 126/25 AA |
| 2002/0134250 | A1 | | 9/2002 | Mosher, II et al. |
| 2003/0094169 | A1 | * | 5/2003 | Alden ....................... 126/25 R |
| 2007/0137634 | A1 | * | 6/2007 | Traeger et al. ................. 126/29 |
| 2007/0277800 | A1 | * | 12/2007 | Chiang ..................... 126/25 R |
| 2009/0239187 | A1 | * | 9/2009 | Johnston ...................... 432/31 |

FOREIGN PATENT DOCUMENTS

FR                2683988  A1  *   5/1993

* cited by examiner

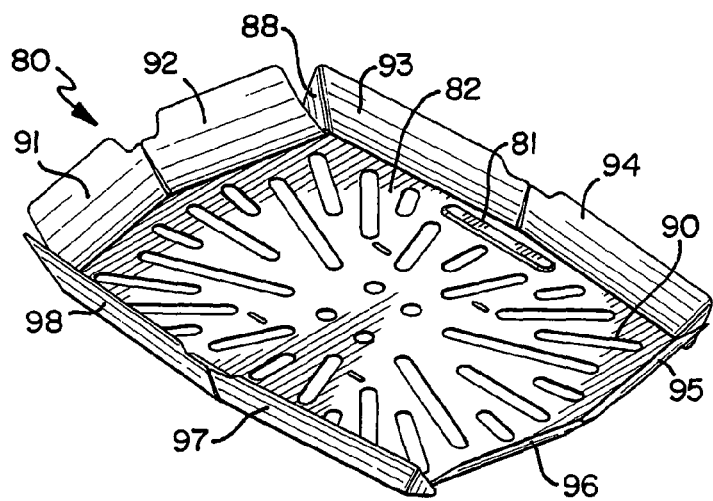
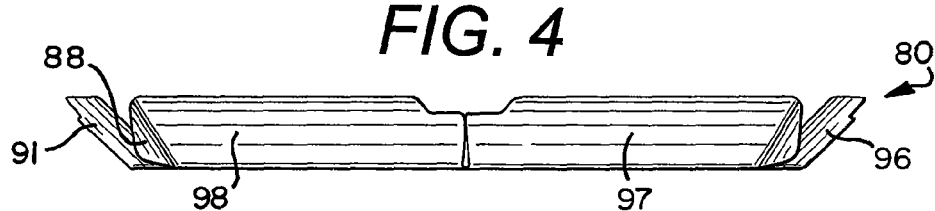
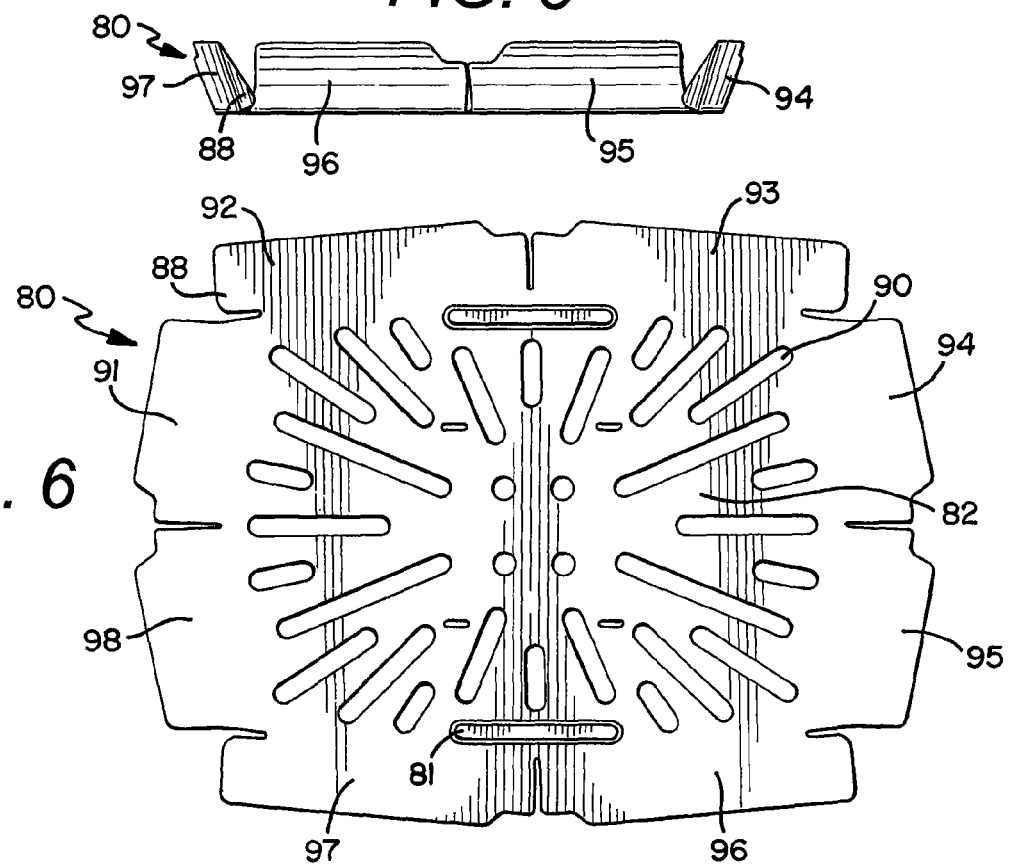

BARBECUE GRILL

TECHNICAL FIELD

The embodiments described and claimed herein relate generally to barbecue grills. More specifically, one embodiment described and claimed herein relates to a charcoal tray for a barbecue grill.

BACKGROUND OF THE INVENTIONS

A first embodiment disclosed herein relates to a barbecue grill charcoal grate which is formed from a sheet metal material. Charcoal grates, which are configured to hold charcoal briquettes or other solid cooking fuel, are well known in the art. Most charcoal grates are constructed from a plurality of transversely oriented wires or rods which are aligned in meshing relationship (see U.S. Pat. Nos. 3,841,299 and 4,463,746). Other charcoal grates are tray-like structures which are constructed from sheet metal, such as the ones disclosed in U.S. Pat. Nos. 2,994,316; 3,828,759; and 5,293,859. The charcoal trays disclosed in these patents include horizontally aligned structures (or lips), which extend from vertically aligned sidewalls and form a perimeter for the tray, to support the tray in the grill firebox. In that manner, the surface area available for holding charcoal briquettes (the area bounded by the vertically oriented sidewalls) is somewhat reduced.

For the most part, the prior art charcoal trays are rectangular shaped, thereby corresponding with the shape of the firebox. Such a configuration is desirable (i.e. correspondingly shaped charcoal tray and firebox) as it allows the grate to utilize as much of the inside area of the firebox as possible (less the area lost due to the horizontal lips). In that manner, the charcoal tray allows the placement of ignited charcoal briquettes directly under a majority of the cooking surface for more even cooking of food. It can be appreciated that the rectangular design of the previously mentioned charcoal trays would not lend itself well to circular, kettle type grills, such as the one shown in U.S. Pat. No. 2,998,814. In that patent, a charcoal holding surface comprised of two or more trays is disclosed, each of which are pie shaped. While the configuration shown in the '814 patent effectively utilizes most of the cross-sectional area of the firebox, the configuration does have its drawbacks. For example, the configuration requires support within the firebox both at the edges and at the center of the firebox. Moreover, the configuration requires the use of at least two separate trays.

There has been a recent trend to make portable barbecue grills more aesthetically pleasing, whereby manufacturers utilize more complex shapes than previously used. One example of such a grill is the Weber® Q™ line of gas-fired barbecue grills, which can be seen at www.weber.com. These barbecue grills utilize a cooking chamber which is generally dome-shaped, whereby the cross-section of the firebox is generally oval shaped. The simple charcoal trays disclosed in the prior art are not well suited to make optimal use of the inside space of such a barbecue grill while at the same time utilizing a simple and inexpensive support mechanism.

A second embodiment disclosed herein relates to a charcoal grill firebox which includes dual-purpose nesting features. It is well known across various arts to design components to allow stacking of the components during shipping or storage. Sometimes, the manufacturer will include male and female nesting features which are configured to mate when the components are stacked, whereby the nesting features engage to resist relative movement between adjacent components. For example, Weber® currently uses one version of a nesting feature for its Q™ series grills, whereby the firebox includes depressions on the inside surface which are configured to receive the legs of a second firebox when stacked.

SUMMARY OF THE INVENTIONS

The various embodiments described herein provide a satisfactory means for overcoming at least some of the problems of the prior art and provide a novel use for a nesting feature which was not previously known. One embodiment disclosed and claimed herein relates to a charcoal grate which is not only made from sheet metal, but also includes numerous features to increase the available surface area for holding charcoal briquettes. More specifically, the embodiment is a charcoal grate for a barbecue grill, which has a firebox with an inside surface. The charcoal grate comprises a bottom wall, a plurality of side walls, and at least one support. The bottom wall is configured to hold charcoal briquettes and has a plurality of apertures which allow combustion air to reach the charcoal briquettes and allow ashes to fall therethrough. The plurality of sidewalls upwardly and outwardly depend from the bottom wall, whereby the sidewalls generally conform to the shape of the inside surface of the firebox. The support is configured to engage with the inside surface of the barbecue grill firebox, thereby supporting the charcoal grate within the firebox.

Another embodiment disclosed and claimed herein relates to a charcoal grill firebox which includes dual-purpose nesting targets, which not only are configured to facilitate nesting of multiple fireboxes, but are also configured to support a charcoal grate. More specifically, the embodiment is a barbecue grill assembly which comprises a first firebox and a grate. The first firebox has an inside surface, an outside surface, and four legs, wherein the four legs depending from the outside surface. The inside surface of the first firebox is generally concave so as to define a cavity for receiving the grate. Also, the first firebox has four depressions formed into the inside surface, wherein the four depressions are configured to at least partially support the grate within the cavity. Moreover, the first firebox is configured to stack with a second firebox which is essentially identical to the first fire box. When stacked, the four legs of the second firebox are received by the four depressions of the first firebox and a space is formed between the inside surface of the first firebox and the outside surface of the second firebox. Even further, the first firebox is configured to stack with a third firebox which is also essentially identical to the first firebox. When stacked, the four legs of the first firebox are received in the four depressions of the third firebox and a space is formed between the inside surface of the third firebox and the outside surface of the first firebox.

BRIEF DESCRIPTION OF THE DRAWINGS

These and other features, aspects, objects, and advantages of the embodiments described and claimed herein will become better understood upon consideration of the following detailed description, appended claims, and accompanying drawings where:

FIG. 3 is a perspective view of a first embodiment of a charcoal tray;

FIG. 4 is a front view of the same;

FIG. 5 is a side view of the same;

FIG. 6 is a top view of the same in a flattened configuration;

Figure 1:
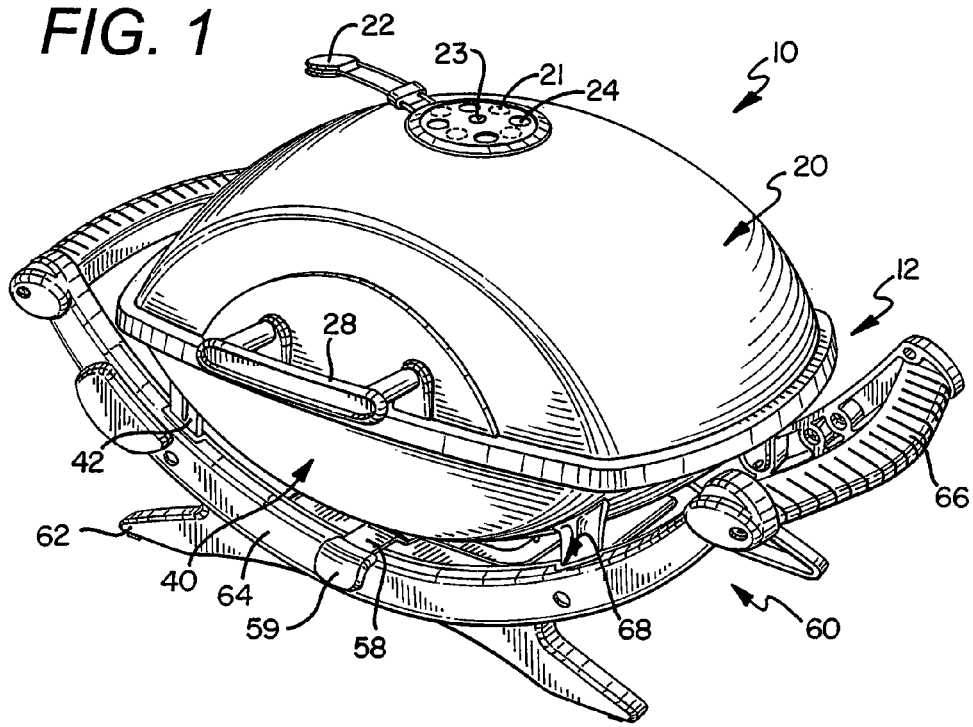
FIG. 1 is a perspective view of a first embodiment of a barbecue grill.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art of grill design may devise a number of alternative configurations that are similar and equivalent to the embodiments shown and described herein without departing from the spirit and scope of the claims.

Like reference numerals will be used to refer to like or similar parts from figure to figure in the following description of the drawings.

DETAILED DESCRIPTION OF THE DRAWINGS

Referring first to FIG. 1, one embodiment of a barbecue grill 10 is shown in perspective view. The barbecue grill 10 incorporates numerous components which are common to most conventional grills. For example, the grill 10 includes a cooking chamber 12 and a frame assembly 60, both of which include many sub-components. It is contemplated, however, that the grill 10 could incorporate additional or fewer components than shown. For example, the grill 10 could include folding side shelves, such as those disclosed in U.S. Pat. Nos. 6,910,476 and 6,976,485 and U.S. patent application Ser. Nos. 11/224,837 and 11/431,738 (which are incorporated herein by reference). Also, the grill 10 could exclude the frame assembly 60 and instead include, for example, a support which is integrally formed or cast into the cooking chamber 12.

Figure 2:
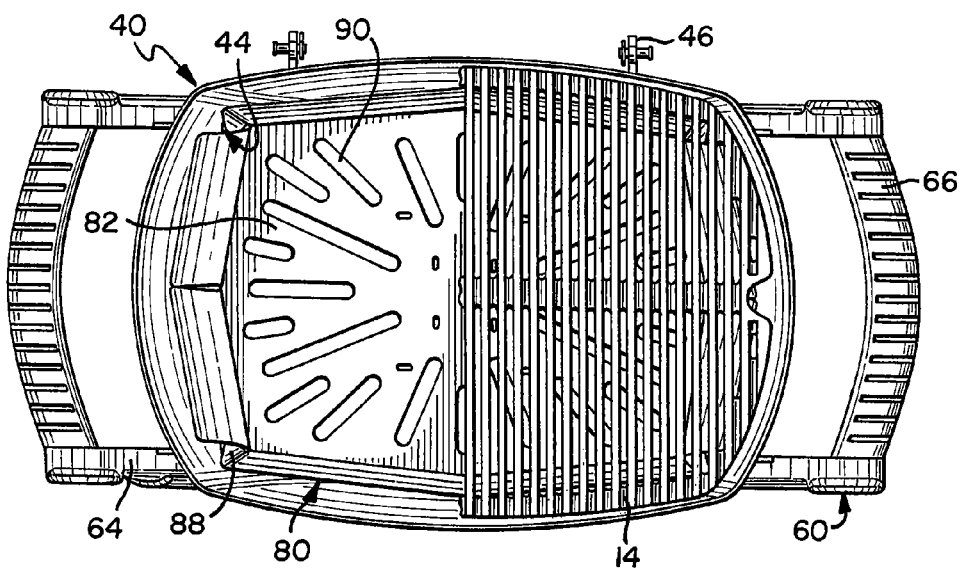
FIG. 2 is a top view of the same with the lid and one cooking grate removed.
Figure 7:
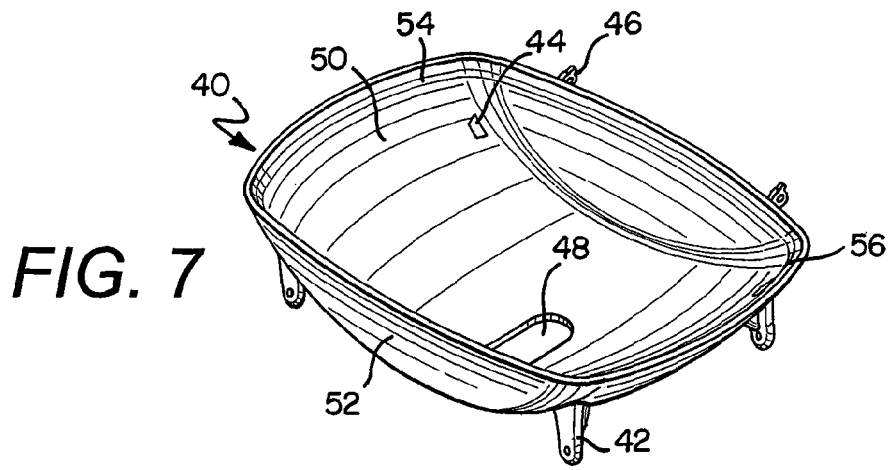
FIG. 7 is a perspective view of a first embodiment of a firebox.
Figure 13:
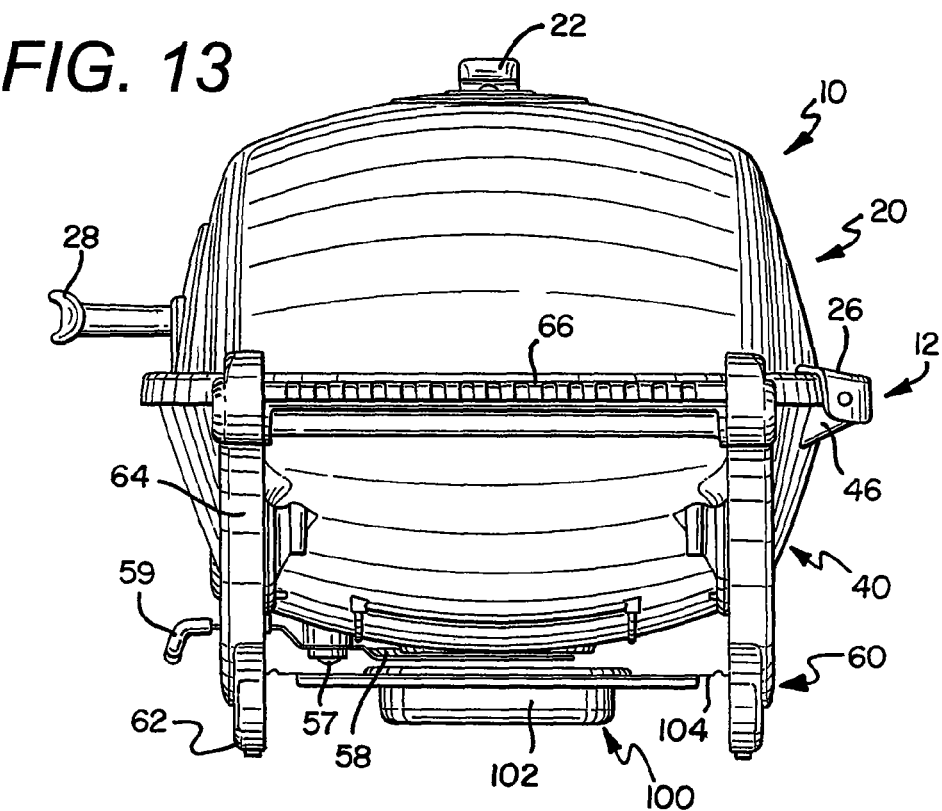
FIG. 13 is side view of the first embodiment of the barbecue grill.

The cooking chamber 12 of the grill 10 is defined by a firebox 40 and a lid 20. Referring briefly to FIG. 2 (a top view of the grill 10 with the various components removed, including the lid 20 and one cooking grate 14), the firebox 40 is configured to hold a charcoal grate 80 and at least one cooking grate 14. With reference now to FIGS. 1 and 13, the lid 20 is hingedly attached to the firebox 40 by means of hinge members 26, 46. However, it is contemplated that the lid 20 could be removable from or slidably attached to the firebox 40. Both the firebox 40 and the lid 20 are generally dome-shaped, although it is contemplated that the firebox and lid could have other shapes, such as generally hexahedral or any other shape. The lid 20 includes a handle 28 which is disposed on the opposite side of the lid 20 as the hinge member 26, a plurality of vents or apertures 21, and a regulator 22 for controlling the size of the vent openings 24. The regulator 22 has a plurality of apertures 24 which correspond to the apertures 21 which are formed in the lid 20. The regulator 22 is pivotably attached at a pivot point 23 which allows the regulator to rotate. The pivot point 23 can be created by means of any fastener known in the art, such as a rivet, a screw, a bolt, or any equivalent. Referring briefly to FIG. 7, the firebox 40 includes an inside surface 50, an outside surface 52, four legs 42 which depend from the outside surface 52, four nesting targets 44 which are disposed on the inside surface 50, and a central aperture 48. Referring again to FIG. 1, the four legs 42 of the firebox 40 are configured to engage with sockets 68 in the support frame 60.

Figure 16:
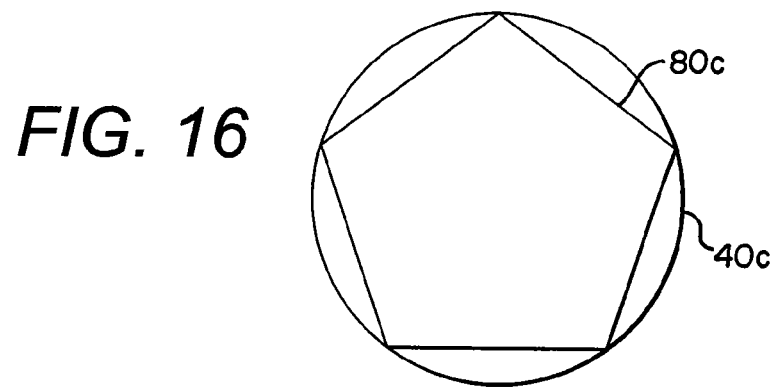
FIG. 16 is a top view of a second embodiment of a firebox supporting a second embodiment of a charcoal tray; and, FIG. 17 is a top view of a third embodiment of a firebox supporting a third embodiment of a charcoal tray.
Figure 17:
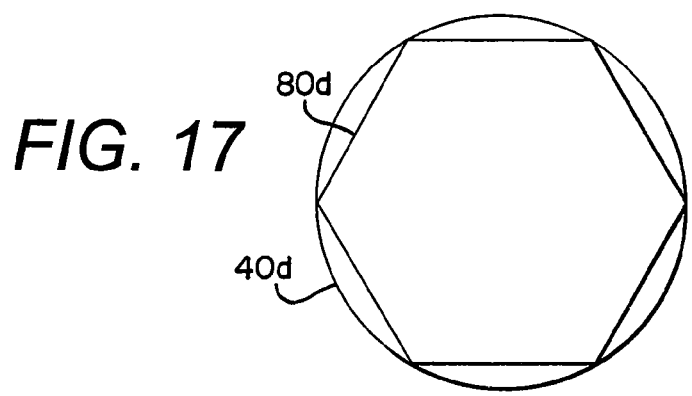

Turning now to FIGS. 3-6, the charcoal grate or tray 80 is shown in further detail. The charcoal grate 80 includes a bottom wall 82 for holding charcoal briquettes or other solid fuel during grill 10 operation. The bottom wall 82 of the grate 80 includes a plurality of apertures or openings 90 which allow combustion air to reach the charcoal briquettes and to allow ashes to fall to the bottom of the firebox 40. The bottom wall 82 also includes two embossments 81, which are longitudinally aligned to increase the structural rigidity of the tray. The embossments 81 could be fewer or greater in number and could be aligned in any direction. The charcoal grate 80 further includes a plurality of outwardly and upwardly depending side panels or walls 91, 92, 93, 94, 95, 96, 97, 98. The side walls 91, 92, 93, 94, 95, 96, 97, 98 are not truly vertical or truly horizontal (although they could be) and instead generally conform to the slope of the firebox 40. When the tray 80 is installed in the firebox, the side walls are positioned in close proximity to the inside surface of the firebox 40, thereby increasing the available surface area of the tray 80 that is available for holding charcoal briquettes. Since the side walls are collectively generally concave, the side walls can support the charcoal briquettes. Moreover, the side walls 91, 92, 93, 94, 95, 96, 97, 98 prevent charcoal briquettes from falling out of the tray 80 and potentially out through the central aperture 48 of the firebox 40. Having eight sidewalls, the bottom wall 81 could thus be characterized as being generally octagonal. Although shown as eight-sided, it is contemplated that the tray 80 could have fewer or more side walls and the bottom wall 81 could have any shape, i.e. circular, square, round, etc. (See, for example, FIGS. 16 and 17 which show two alternate embodiments of a tray 80c and 80d in firebox 40c and 40d.)

Figure 10:
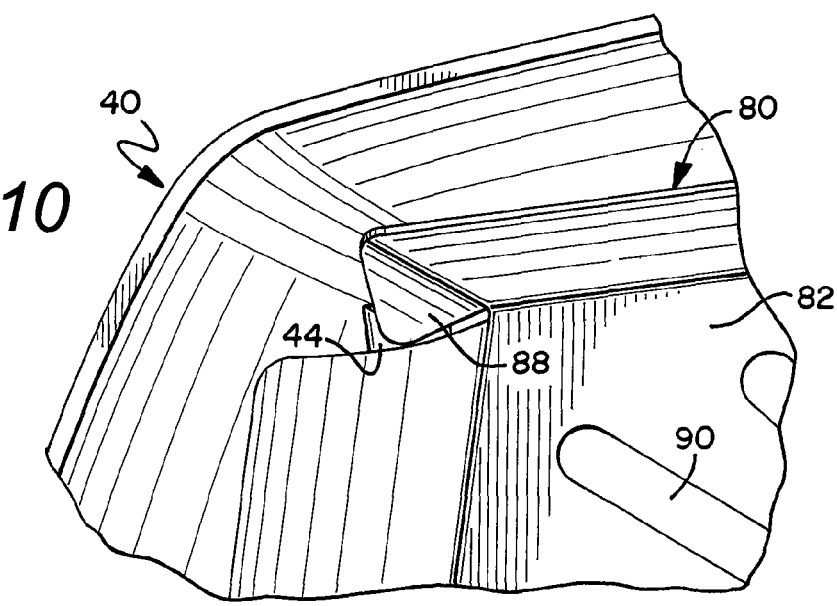
FIG. 10 is a close-up view of the first embodiment of the charcoal tray resting inside of the first embodiment of the firebox.

The charcoal grate 80 also includes four extensions or tabs 88 which are configured to engage with the nesting targets 44 of the firebox 40, thereby holding the charcoal grate 80 within the cavity of the firebox 40. See, for example, FIG. 2 and, especially, FIG. 10 which shows the tab 88 resting inside of the nesting target 44. Referring again to FIGS. 3-5, the tabs 88 extend from the side walls 93, 94, 97, 98, although it is contemplated that the tabs 88 could depend from any portion of the charcoal grate 80, including the bottom wall 82 or any of the remaining side walls. The tabs 88, like the side walls 91, 92, 93, 94, 95, 96, 97, 98 are not aligned perfectly vertical or perfectly horizontal (although they could be). Instead, the tabs 88 somewhat conform to the shape of the inside surface 50 of the firebox, although slightly tilted outwardly towards the inside surface 50 such that the tabs rest in and engage with the nesting targets 44. As can be seen from FIGS. 2, 4 and 5, the tabs 55 slightly overlap the end walls 91, 92, 95, 96 thereby at least partially closing the gaps at the four major corners of the tray (see gap between 98 and 91; between 92 and 93; between 94 and 95; and between 98 and 91).

Referring now to FIGS. 2 and 3, there are four tabs 88, one at each of the four major corners of the grate 80. The four tabs 88 are configured to engage with each of the four nesting targets 44 of the firebox 40. However, it is contemplated that fewer or greater tabs 88 could be used. Moreover, not all of the tabs 88 need to engage with nesting targets. For example, some of the tabs 88 (or even the bottom wall 80 or the side walls 91, 92, 93, 94, 95, 96, 97, 98) could rest against the inside surface 50 of the firebox 40 or other non-disclosed features which depend from the inside surface 50 of the firebox 40.

The shown charcoal grate 80 is formed from a single piece of sheet metal, whereby manufacture of the grate 80 does not necessarily require welding, adhereing, fastening, or any other similar steps. It is contemplated that such steps could be incorporated for any reason, such as to increase the rigidity or to add optional components to the tray. Moreover, it is contemplated that the novel features of the charcoal tray disclosed herein could be incorporated into charcoal grates which are cast metal or are made using any other process. FIG. 6 shows the grate 40 in a generally flattened state with the embossments 81, apertures 90, and boundary already formed therein. To complete the manufacture of the grate 80, the side walls 91, 92, 93, 94, 95, 96, 97, 98 merely need to be bent upwardly into position. The forming of the grate 80 may require the use of multiple forming or stamping steps, which could be performed in any order.

Figure 8:
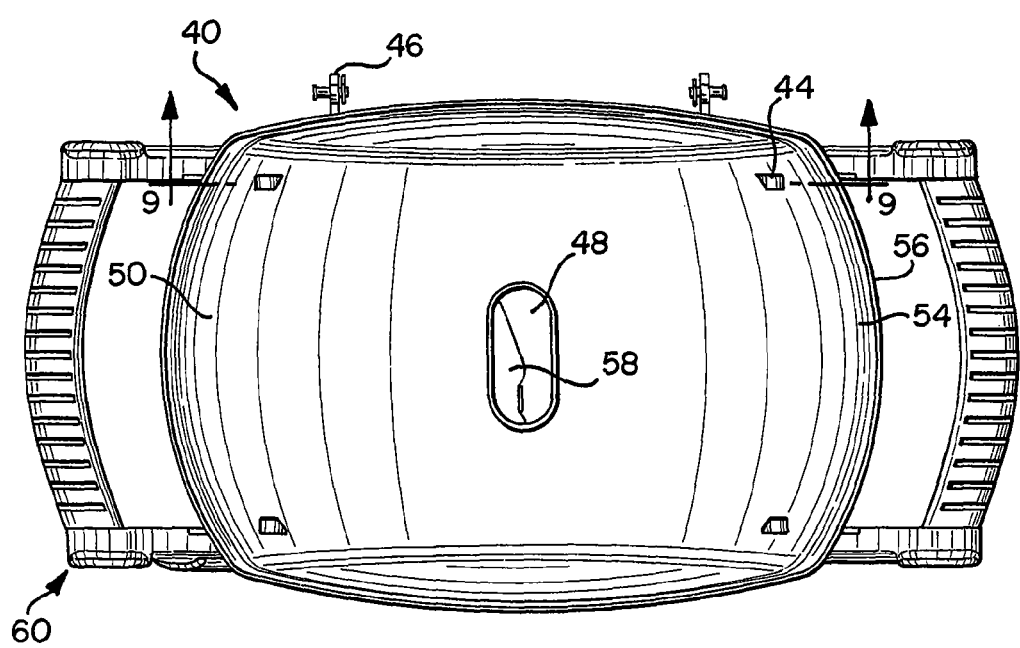
FIG. 8 is a top view of the same resting on a first embodiment of a frame assembly.
Figure 9:
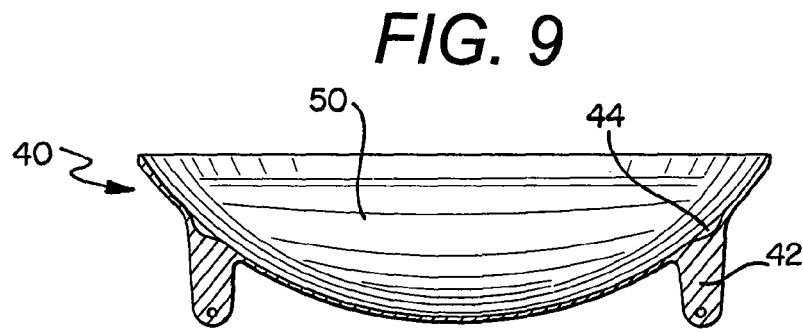
FIG. 9 is a sectional view through the plane identified in FIG. 8, with the frame assembly removed for clarity.
Figure 14:
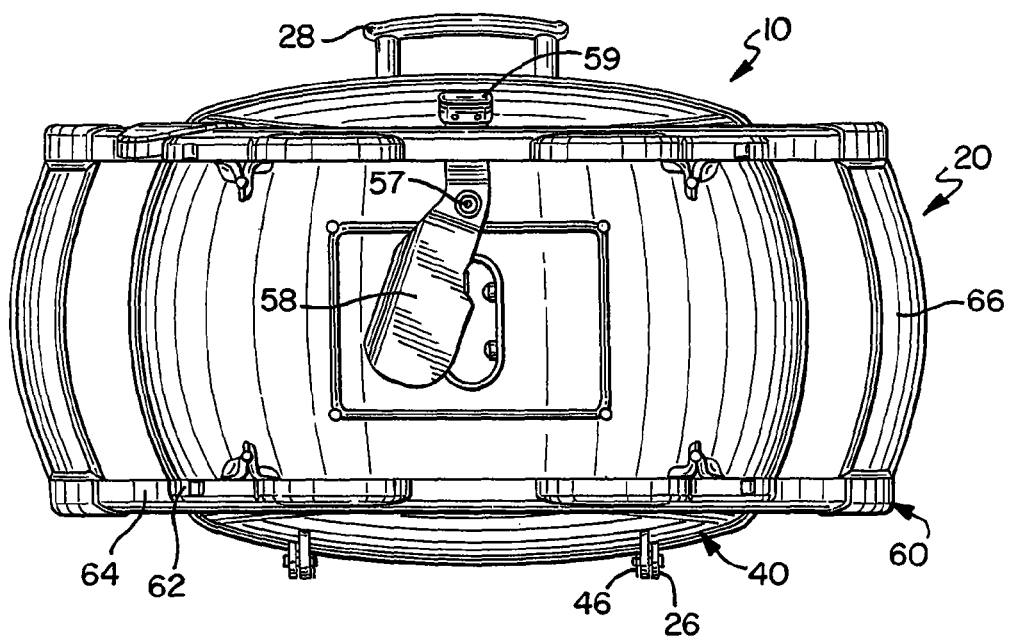
FIG. 14 is a bottom view of the same with the ash tray removed for clarity.

Turning now to FIGS. 7-9, the firebox 40 is shown in more detail. As briefly discussed above, the firebox 40 includes an inside surface 50, an outside surface 52, hinge members 46, four legs 42, four nesting targets 44, a central aperture 48, and a regulator 58. The firebox 40 also includes a ledge 54 near an upper rim 56. The ledge 54 is configured to support the cooking grate 14 (see FIG. 2). As discussed above, the hinge member 46 is configured to engage with corresponding hinge members 26 of the lid 20 to allow the lid 20 to pivot between open and closed positions. The central aperture 48 is adapted to allow combustion air to enter the cooking chamber 12, to allow grease to drain out of the cooking chamber 12, and/or to prevent the excessive accumulation of ashes in the bottom of the cooking chamber 12. The regulator 58 is adjustable to open and close the aperture 48. Briefly referring to FIG. 14, the regulator 58 is shown to be pivotably attached to the outside surface 52 of the firebox at pivot point 57. The pivot point 57 can be any fastener known in the art, such as a rivet, a bolt, a screw, or the equivalent. Although shown attached to the firebox 40, it is contemplated that the regulator 58 could be fastened to the frame assembly 60. The regulator 58 includes a handle 59 at a distal end for controlling the position of the regulator 58. The four legs 42 depend from the outer surface and are configured to engage with the frame assembly (see FIG. 1). The four nesting targets 44 are positioned on the inside surface 50 of the firebox 40. With particular reference to FIG. 9, a cross-section of the firebox 40, the nesting targets 44 are depressions or sockets. As discussed above, the nesting targets 44 serve to support the charcoal grate 80. However, it is contemplated that the nesting targets 44 could alternatively be configured to support the cooking grate 14. In addition to supporting the charcoal grate 80 or the cooking grate 14, the nesting targets 44 are also configured to aid in the stacking of fireboxes, which may be desired during shipping or storage.

Figure 11:
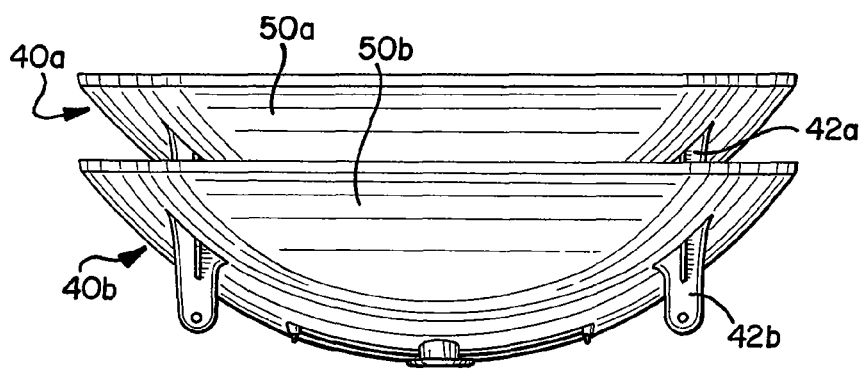
FIG. 11 is a front elevational view of the first embodiment of the firebox in a stacked configuration.
Figure 12:
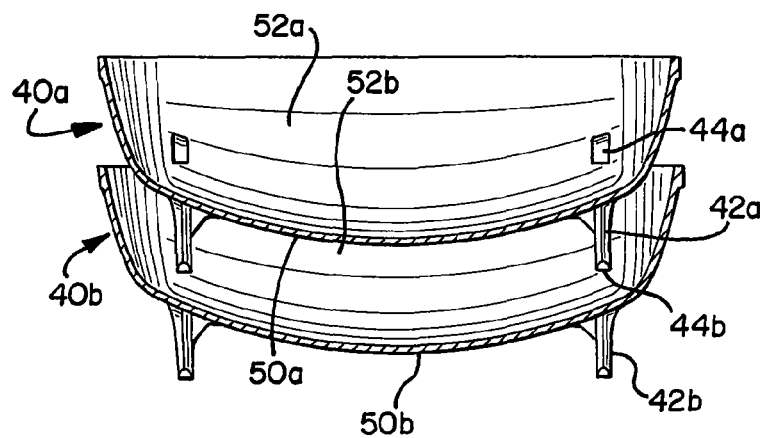
FIG. 12 is a sectional view of the same.

Turning now to FIGS. 11 and 12, the stacking feature of the firebox 40 is shown. A first firebox 40a is shown stacked with a second firebox 40b. It is contemplated that additional fireboxes 40 could be stacked above the first firebox 40a and below the second firebox 40b. As best shown in FIG. 12, the legs 42a serve as nesting projections while the nesting targets 44b serve as nesting sockets, whereby the nesting projections 42a are received by the nesting sockets 44b. The engagement of the nesting projections 42a with the nesting sockets 44b serves to provide a distance or a space between the outside surface 52a of the first firebox 40a and the inside surface 50b of the second firebox 40b. In that respect, additional packing material is not needed to protect the inside and outside surfaces from damage during shipping. This not only reduces the cost of packing material, it also reduces the weight and overall cost of shipping the components. While the nesting projections 42 and the legs 42 are shown in all figures to be one and the same, it is contemplated that the legs and the nesting projections could be separate components. Moreover, while the nesting projections 42 are shown to depend from the outside surface 52 and the nesting sockets 44 are shown to depend from the inside surface 52, it is contemplated that the nesting projections 42 could depend from the inside surface 50 and the nesting sockets 44 could depend from the outside surface 52.

Figure 15:
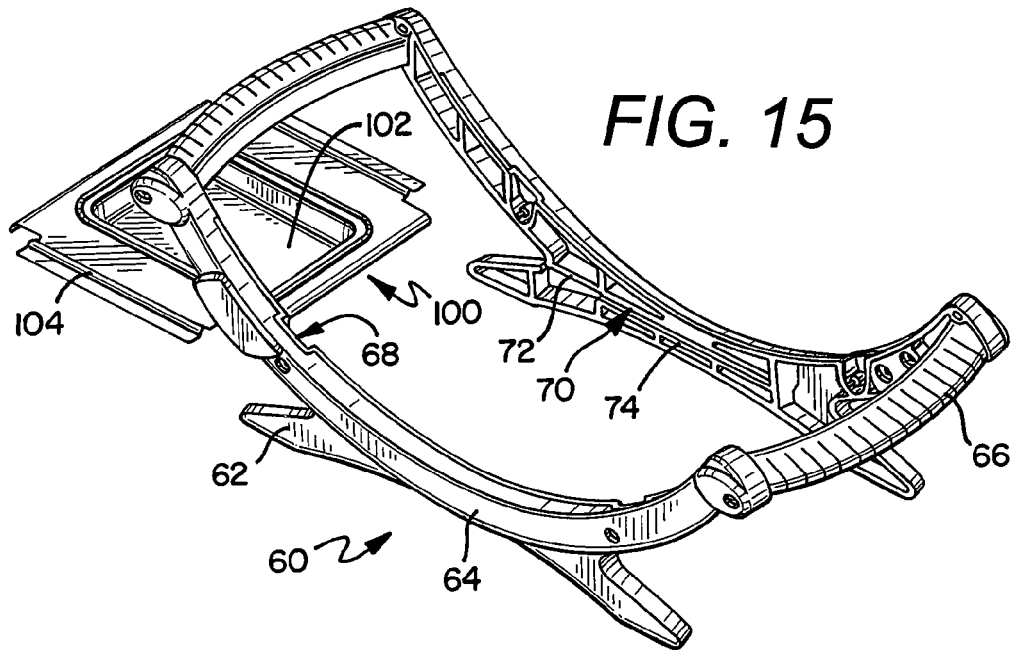
FIG. 15 is an exploded, perspective view of the frame assembly and the ash tray.

With reference to FIGS. 1, 13, and 15, the frame assembly 60 serves to support the barbecue grill 10 and hold the ash/grease tray 100 underneath the central aperture 48 of the firebox 40. The frame assembly 60 is comprised of two frame members 64, and two interconnecting cross-member (or handles) 66, four sockets 68, and four feet 62. The handles 66 interconnect the two frame members 64 and provide rigidity to the frame assembly 60. The four sockets 68 are formed into the frame members 64 and are configured to receive the legs 42 of the firebox 40. The feet 62 depend from the frame members 64 and are configured to support the grill 10 on a cart assembly, a floor surface, a table surface, or any other surface. The frame assembly 60 is configured to receive an ashtray 100 between the two frame members 64 within the slots 70. The tray includes a recessed portion 102 and flange portions 104 which are configured for sliding engagement with the slots 70. The slots 70 each include an entry portion 72 and a stepped down portion 74. The stepped down portion 74 is at a lower elevation than the entry portion 72 such that the ashtray 100 must be slightly lifted before it can be removed.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

I claim:

1. A charcoal grate and a firebox for a barbecue grill, the firebox comprising an inside surface and the charcoal grate comprising:

a bottom wall, a plurality of side walls, and at least one support; said at least one support extending mostly horizontally from at least one of said plurality of side walls and engaged with at least one nesting target comprising a recess on the inside surface of the firebox;

the bottom wall being configured to hold charcoal briquettes and having a plurality of apertures which allow combustion air to reach the charcoal briquettes and allow ashes to fall therethrough;

the plurality of sidewalls upwardly and outwardly extending about the periphery of the bottom wall whereby the sidewalls generally conform to the shape of the inside surface of the firebox and are not directly connected to an adjacent sidewall; and, at least a portion of the support abuts a portion of the inside surface of the firebox, thereby supporting the charcoal grate within the firebox.

2. The charcoal grate and the firebox of claim 1, wherein the bottom wall of the charcoal grate includes at least one embossment which adds structural rigidity to the charcoal grate.

3. The charcoal grate and the firebox of claim 2, wherein the embossment has a length and a width, whereby the length is aligned generally parallel to a longitudinal axis of the charcoal grate.

4. The charcoal grate and the firebox of claim 1, wherein the charcoal grate is generally octagonal to fit within the firebox which has a generally oval cross-section.

5. The charcoal grate and the firebox of claim 4, wherein the quantity of the plurality of side walls is eight, the quantity of supports is four, the charcoal grate includes four major corners and four minor corners, the four majors corners being defined by corners where the outside angles between adjacent side walls are greatest, the four supports being disposed at the four major corners, respectively.

6. The charcoal grate and the firebox of claim 1, wherein the at least one support is at least one side wall extension.

7. The charcoal grate and the firebox of claim 6, wherein the at least one support is configured to engage with at least one nesting target on the inside surface of the firebox.

8. The charcoal grate and the firebox of claim 6, wherein the at least one side wall extension generally conforms to the shape of the inside surface of the firebox.

9. The charcoal grate and the firebox of claim 6, wherein the plurality of side walls includes a first side wall and a second side wall, the first side wall and the second side wall being adjacent, and the at least one side wall extension extending from the first side wall and at least partially overlapping the second side wall.

10. The charcoal grate and the firebox of claim 1, wherein the charcoal grate is formed from a single piece of sheet metal.

11. The charcoal grate and the firebox of claim 1, wherein the plurality of side walls are configured to be in close proximity to the inside surface of the firebox thereby preventing charcoal briquettes from falling in any gap which may be present between the side wall and the inside surface of the firebox and, when viewed collectively, are generally concave.

12. A charcoal grate and a firebox for a barbecue grill, the firebox comprising an inside surface and the charcoal grate comprising:

a bottom wall, at least five side walls, wherein each side wall is not in direct contact with an adjacent side wall, and at least one tab extending mostly horizontally from at least one side wall;

the bottom wall being configured to hold charcoal briquettes, having at least five sides, and having a plurality of apertures which allow combustion air to reach the charcoal briquettes and allow ashes to fall therethrough;

the at least five sidewalls extending from the bottom wall; and, at least a portion of the tab abuts a recess on a portion of the inside surface of the barbecue grill firebox, thereby supporting the charcoal grate within the firebox.

13. The charcoal grate and the firebox of claim 12, wherein the quantity of the at least five sides is eight and the quantity of the at least five side walls is eight.

14. The charcoal grate and the firebox of claim 12, wherein the at least one tab extends from at least one of the side walls.

15. The charcoal grate and the firebox of claim 12, wherein the charcoal grate is formed from a single piece of sheet metal.

16. The charcoal grate and the firebox of claim 12, wherein the at least five side walls includes a first side wall and a second side wall, the first side wall and the second side wall being adjacent, and the at least one side wall extension extending from the first side wall and at least partially overlapping the second side wall.

17. A charcoal grate and a firebox for a barbecue grill, the firebox comprising an inside surface and the charcoal grate comprising:

a single piece of sheet metal being formed into a tray having a bottom wall, at least four side walls, and at least four mostly horizontal support tabs;

the bottom wall being configured to hold charcoal briquettes and having a plurality of apertures which allow combustion air to reach the charcoal briquettes and allow ashes to fall therethrough;

the at least four sidewalls upwardly and outwardly depending from the bottom wall, generally conforming to the contour of the inside surface of the firebox, and being positioned in close proximity to the inside surface of the firebox, wherein each side wall is not in direct contact with an adjacent side wall; and surface of the firebox; and, the at least four support tabs extending from the at least four side walls, whereby at least a portion of the at least four support tabs abuts a recess on a portion of the inside surface of the firebox to support the tray therein.

* * * * *